United States Patent [19]

Brown

[11] Patent Number: 4,653,523
[45] Date of Patent: Mar. 31, 1987

[54] PNEUMATIC AMPLIFIER WITH NEGATIVE FEEDBACK FOR CURRENT TO PRESSURE TRANSDUCER

[75] Inventor: Gregory C. Brown, Chaska, Minn.
[73] Assignee: Rosemount Inc., Eden Prairie, Minn.
[21] Appl. No.: 779,807
[22] Filed: Sep. 25, 1985
[51] Int. Cl.[4] .............................................. G05D 16/00
[52] U.S. Cl. ....................................................... 137/85
[58] Field of Search .......................... 137/85, 84, 116.5
[56] References Cited

U.S. PATENT DOCUMENTS 3,003,475 10/1961 Rouvalis ............................. 137/85 X
3,165,262 1/1965 Ollivier .............................. 137/85 X Primary Examiner—Alan Cohan
Attorney, Agent, or Firm—Kinney & Lange

[57] ABSTRACT

A fluid amplifier is used in a pneumatic transducer to provide a control output pressure in response to a pilot pressure provided as a function of a current signal. The fluid amplifier includes a valve that opens a pressure source to the control port and also controls pressure feeding through an exhaust passageway. The amplifier valve is provided with a negative feedback arrangement as the exhaust back pressure increases to stabilize the operation and make the amplifier less sensitive. The pneumatic amplifier is provided with a diaphragm arrangement that results in increasing exhaust back pressures tending to close the exhaust valve, rather than open the exhaust valve. The negative feedback makes the valve more easily controlled and provides for more stable operation.

3 Claims, 2 Drawing Figures

PNEUMATIC AMPLIFIER WITH NEGATIVE FEEDBACK FOR CURRENT TO PRESSURE TRANSDUCER

BACKGROUND OF THE INVENTION

1. Field of the Invention

The present invention relates to a fluid. booster amplifier which stabilizes operation by providing a negative feedback arrangement responsive to back pressures in an exhaust conduit.

2. Description of the Prior Art

U.S. Pat. No. 4,481,967 shows a control circuit for a current to pressure converter in which a pilot pressure provides pneumatic signals to a fluid amplifier, which provides pressure for process control. The device disclosed in U.S. Pat. No. 4,481,967 has electronic feedback. In FIG. 1 of this patent, a pneumatic booster amplifier of conventional design is shown in block diagram form. A typical pneumatic booster amplifier provides a diaphragm responsive to the pilot pressure, which then in turn operates a valve arrangement to provide an output pressure that is a proportional to the pilot pressure at a balanced condition.

U.S. Pat. No. 4,325,399 also discloses a current to pressure converter and schematically illustrates a spool valve type pneumatic amplifier.

FIG. 1 of the drawings of this application illustrates a conventional prior art fluid amplifier. Problems arise with the conventional prior art amplifier as shown in FIG. 1, in that the control air supply is proportioned with a valve assembly between a supply and exhaust port. The amount the exhaust valve opens is dependent upon the position of a flexible diaphragm that is sensitive to a pilot pressure, for example, a pilot pressure developed by a nozzle illustrated in the patents mentioned above. As exhaust flow through the exhaust port increases and back pressure developes in the exhaust passageways, the exhaust control valve moves from the force developed by exhaust back pressure. This positive feedback makes the valve difficult to fine tune, and it tends to create instability in operation.

Another standard type pneumatic booster amplifier is shown in Van Nostrand Scientific Encyclopedia, Sixth Edition (1983), pp. 2265-2266, where a discussion of pneumatic controllers is given. Also, typical pneumatic booster amplifiers are shown in "Modern Control Engineering", (Ogata Prentice Hall, Inc. 1970) in Section 5.2, page 161.

SUMMARY OF THE INVENTION

The present invention relates to a pneumatic booster amplifier for use primarily in a current to pressure transducer or pneumatic controller, which has an amplifier valve actuated to provide an output pressure proportional to an input or pilot pressure. This is accomplished by balancing fluid flow from a source between an exhaust passageway and an outlet for control pressure. The amplifier of the present invention includes an additional diaphragm sensitive to exhaust back pressure to provide a supplemental balancing force tending to close off the exhaust flow as the exhaust back pressure increases. The force from the additional diaphragm tending to close the exhaust valve can be controlled to a fairly low level, so that the amplifier is quite easily dynamically tuned and tends to lessen the likelihood of the exhaust valve overshooting its desired, balanced position during operation.

The pneumatic amplifier has a double diaphragm assembly which during supply flow responds to pilot pressure, causing the control valve to open to provide outlet pressure which also acts to open the exhaust valve and to cause exhaust flow until pressures are balanced. The diaphragm sizes are selected so that back pressure in the exhaust passageway generates a net force tending to cause the exhaust port to close rather than open.

The unit is easily installed in the existing systems, and provides a negative feedback that aids in stability using mechanical elements.

DETAILED DESCRIPTION OF THE PREFERRED EMBODIMENTS

Figure 1:
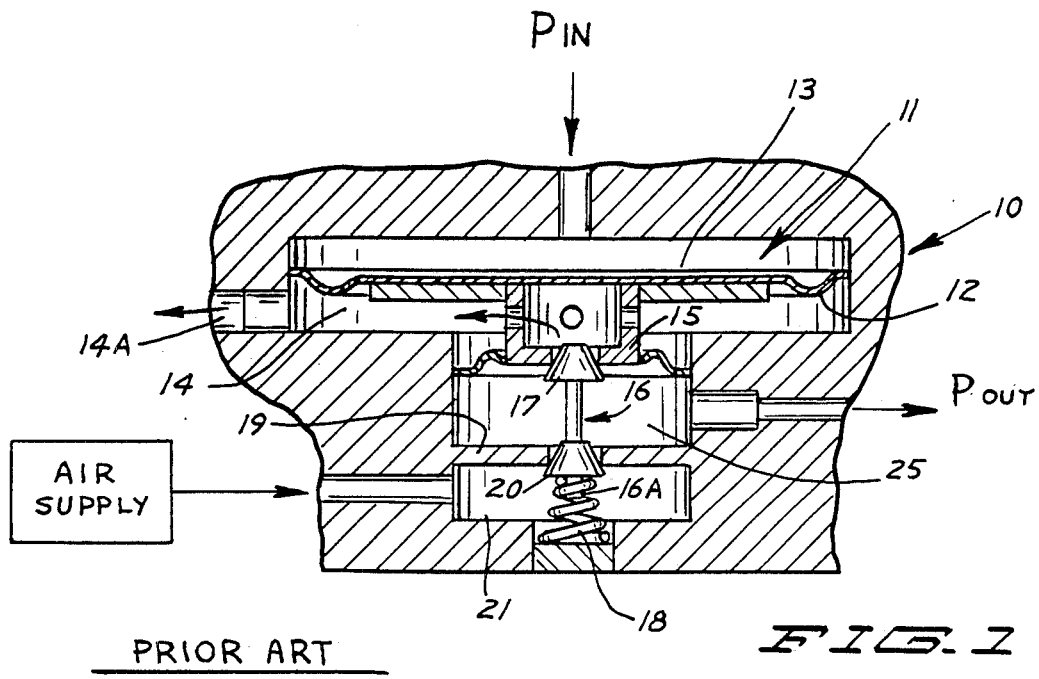
FIG. 1 is a cross sectional, schematic view of a prior art direct acting pneumatic amplifier relay used in pneumatic controllers.

In FIG. 1, a typical prior art pneumatic booster amplifier is shown schematically. It includes a housing 10, with the housing having a first internal chamber 11 that has a flexible diaphragm 12 assembly extending thereacross to divide the chamber 11 into two portions including a pilot pressure actuating portion 13, and an exhaust chamber portion 14 that exhaust oulet port 14A. The diaphragm 12 has a central portion comprising a valve housing 15, that has an exhaust valve seat. A poppet valve assembly 16 has a first exhaust valve head 17 mating with the exhaust valve seat. The valve assembly 16 has a stem 16A that is coupled to a spring 18 that forces poppet vavle assembly 16 upward.

The valve assembly 16 passes through an opening in a divider wall 19 separating the interior of the housing 10 into additional chambers comprising an air supply chamber 21 and an output control pressurre chamber 25. A second valve head 20 mates with a valve seat in divider wall 19 to control flow between the supply pressure chamber 21 and the output control pressure chamber 25. A diaphragm 22 is connected to valve housing 15 and to walls of housing 10 to form a wall of output chamber 25 with respect to the exhaust chamber 14.

The supply pressure chamber 21 is connected to an air supply that provides air pressure at a desired pressure. The spring 18 supports the valve head 20 so that supply pressure tends to seat the valve head 20 against the seat in wall 19 to shut off the supply chamber 21 from ouput chamber 25.

The flexible diaphragm 12 deflects toward the valve 16 when pilot pressure ($P_{in}$) is increasing in chamber 13 or when the pilot pressure is first sensed. Valve housing 15 then bears on valve head 17 and moves valve head 20 away from its seat in wall 19 to permit fluid to flow into chamber 25 from the air pressure source and chamber 21. The pressure in chamber 25 acts on diaphragm 22 to start to open a passageway past valve head 17 into housing 15 to bleed to the exhaust chamber 14. The flow into the exhaust through openings in housing 15 chamber will go out through an exhaust port 14A. When the forces from the output pressure balances the forces from the pilot pressure, the valve reaches equilibrium and both valve heads 17 and 20 will be closed.

As equilibrium is being reached and there is exhaust flow, a back pressure will tend to be built up in the chamber 14, particularly if there is a restriction in the exhaust lines. The back pressure in chamber 14 will act on the opposite side of the diaphragm 12 from the pilot pressure ($P_{in}$) in the chamber 13, and the back pressure caused by exhaust flow will tend to lift the diaphragm 12 and valve housing 15, thereby tending to cause the exhaust opening to increase relative to valve head 17. This is positive feedback to the valve.

When $P_{in}$ drops, the diaphragm 12 will be moved away from the chamber 25 opening the exhaust valve by moving the housing and valve set away from valve head 17, again causing exhaust flow until equilibrium is established. Here, too, positive feedback of exhaust pressure can cause instability.

Equilibrium is desired to be established when pressure in chamber 25 is proportional to $P_{in}$ (pilot pressure). However, with positive feedback the exhaust opening will tend to overshoot, causing the amplifier to hunt, and making it difficult to tune the unit to be sensitive and yet stable.

Figure 2:
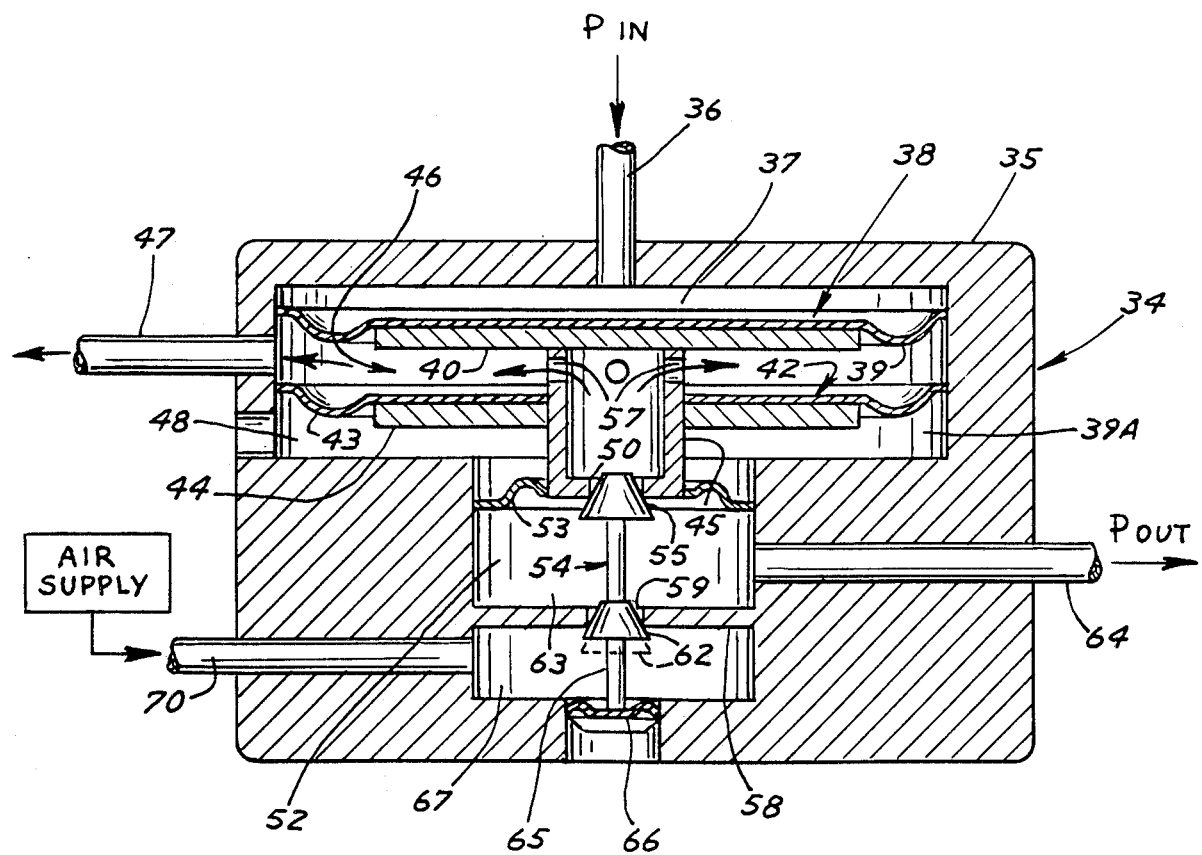
FIG. 2 is a cross sectional, schematic view of a pneumatic booster amplifier made according to the present invention.

The device of the present invention shown in FIG. 2 overcomes the inherent instability of the prior art amplifier shown in FIG. 1. As shown in FIG. 2, a pneumatic booster amplifier 34 includes a housing 35 formed in a conventional manner and includes a pilot pressure inlet conduit 36, leading into a pilot pressure chamber 37 that is defined by a first diaphragm assembly 38 dividing an interior cavity indicated generally at 39A in the housing 35. As can be seen the first diaphragm assembly 38 has a flexible annular web 39 joining it to the wall defining the internal cavity in the housing 35, and a central rigid plate portion 40. The interior cavity 39A of the housing 35 further has a second diaphragm assembly indicated generally at 42 that is spaced from the first diaphragm assembly 38 and has a flexible annular diaphragm web 43 bonded to central rigid plate portion 44 to the walls of the interior cavity 39 of the housing 35.

The center plate like diaphragm portions 40 and 44 are fixed to a unitary valve housing indicated at 45, and the space between the diaphragm assemblies 38 and 42 defines an exhaust chamber indicated generally at 46, that leads to an exhaust conduit 47. The valve housing 45 is sealed to plate portion 44 and has means defining a lower valve seat indicated at 50. The valve housing 45 is joined to the walls of an interior passageway 52 defined in the housing 35 with a third flexible diaphragm indicated generally at 53 which is connected to the interior wall of passageway 52. The chamber 48 formed between diaphragm 53 and diaphragm 42 is vented to atmosphere.

In this form of the invention, a poppet valve assembly 54 has an exhaust valve head 55 that fits with respect to the seat 50, and when open forms an exhaust port leading to the interior of the valve housing 45, as controlled by the valve head 55. The exhaust port at valve seat 50 leads to an interior chamber in valve housing 44 that has openings 57 leading into the exhaust chamber 46 and thus to the exhaust conduit 47. The lower end of interior passageway 52 is closed with a wall 58 spaced from diaphragm 53 (below it as shown) that has a valve seat 59 defined therein. The valve assembly 54 has a second valve head 62 mounted thereon which mates with the valve seat 59, and cooperates with that seat to control flow to an output control pressure chamber 63 defined between the wall 58 and the diaphragm 53. Output chamber 63 has an output pressure conduit 64 provided for carrying the output control pressure to remote actuators or other desired valves or controls.

The valve assembly 54 has a valve stem 65 that extends below the valve head 62 which is connected to a flexible diaphragm 66 which is supported on the housing 35. The outer or lower side of the diaphragm 66 is open to atmospheric pressure. A supply pressure chamber 67 is formed between the wall 58 and diaphragm 66. A pressure supply conduit 70 leads from a supply of fluid under pressure to chamber 67.

In the device of the present invention, when pilot pressure $P_{in}$ increases (or commences) through the conduit 36, a force will be generated by pressure on plate 40 of the diaphragm assembly 38 moving the valve housing 45 toward the valve assembly 54 and at the same time the central plate 44 of diaphragm assembly 42 will be moved because it is mechanically connected to the central plate portion 40 of the diaphragm assembly 38. This movement toward wall 58 will force the valve head 62 away from the seat 59, permitting the fluid under pressure from the supply to flow past the valve seat 59 into the output pressure chamber 63 and out the output control pressure conduit 64. The pressure created in the chamber 63 will act on the diaphragm 53 to tend to counter balance the force generated from the pilot pressure on diaphragm plate portion 40 and the force from the output pressure then will move the valve housing 45 and central diaphragm portions 40 and 44 away from the valve head 55, thereby separating the valve head 55 away from seat 50, permitting a portion of the fluid under pressure in chamber 63 to exhaust into the valve housing 45, and out through the openings 57 into the chamber 46 and out through the conduit 47. The primary feedback to balance the pilot pressure is provided by the control pressure acting on the lower surface of diaphragm 53.

In designing the present device, the central plate portion 44, which effectively provides the active part of the diaphragm assembly 42 is made to be slightly larger diameter than the diaphragm central plate portion 40 of diaphragm assembly 38. This means that pressure generated in the chamber 46 due to back pressure developed by flow through the exhaust conduits will create a force that also tends to move the valve housing 45 back toward the valve head 55 as the exhaust back pressure increases. This then tends to close off the exhaust port 50 along with the pressure on the upper surface of diaphragm assembly 38.

The net valve closing force from exhaust back pressure provides negative feedback, so that as the exhaust flow increases (and exhaust back pressure increases) there is a greater tendency to close off the flow past the seat 50. This provides for a more easily balanced pressure control arrangement, to insure that the flow or pressure being provided in conduit 64 will be proportional to the pilot pressure in the conduit 36 and that the valve can be tuned to be very sensitive to changes in pilot pressure without becoming unstable.

If the pilot pressure decreases, the pressure in the control chamber 63 will cause the entire valve housing 45 and both diaphragm center plate portions 40 and 44 to move away from valve head 55 to cause exhaust flow out past the valve seat 50 and past the valve head 55. In turn, the air supply to the control chamber 63 will be reduced because the valve head 62 will move up toward the seat 59, closing off the supply pressure. An equilibrium is established and in this way the control pressure port in conduit 64 is made proportional to the pilot pressure $P_{in}$.

It can thus be seen by selecting the diaphragm sizes, and effectively coupling together the two diaphragms that are affected by the exhaust back pressure (one diaphragm creates a force in one direction while the other diaphragm creates a counter force), the diaphragms can be made to provide a negative feedback response to exhaust flow to increase the stability of the system without sacrificing sensitivity or accuracy.

The present device shown in FIG. 2 reduces the gain during an exhaust cycle by generating this negative feedback, and allows easy dynamic tuning of a complete current to pressure converter, in which this type of booster amplifier is used.

As stated, the chamber that is formed between the diaphragm 53 and the diaphragm 42 is vented to atmosphere, and does not carry any exhaust flow, in that the valve housing 45 is closed off in the region of that particular chamber, that is, the valve housing is not open between the diaphragm 42 and the diaphragm 53. The cross sectional shape of cavity 39 and passageway 52 may be circular, or any other desired configuration.

Although the present invention has been described with reference to preferred embodiments, workers skilled in the art will recognize that changes may be made in form and detail without departing from the spirit and scope of the invention.

What is claimed is:

1. A fluid amplifier assembly for providing a control pressure at an outlet controlled as a function of a pilot pressure applied to the fluid amplifier, and including:
    a housing having an interior chamber;
    first and second diaphragms that are spaced apart substantially equal distances across the surfaces of the diaphragms and which are mounted on the interior chamber to divide such interior chamber into first and second chambers;
    said first chamber comprising a pilot pressure chamber, and said second chamber being defined between said first and second diaphragms and comprising an exhaust chamber;
    means coupled to a source of the pilot pressure external to the fluid amplifier assembly for providing the pilot pressure to the pilot pressure chamber;
    means defining an exhaust valve seat leading to said exhaust chamber;
    a third diaphragm substantially smaller in effective size than the first and second diaphragms and mounted in said housing and connected to the means defining said exhaust valve seat;
    a valve assembly mounted in said housing and having a first valve portion for controlling flow from a source of fluid under pressure to an outlet, said exhaust valve seat opening from said outlet, and said valve assembly having a second valve portion mating with said exhaust valve seat to control flow from the outlet to the exhaust chamber;
    said first, second and third diaphragms and said means defining said exhaust valve seat being coupled for simultaneous movement along a directional axis, increasing pressure in said pilot pressure chamber causing said first diaphragm to move said exhaust valve seat against the second valve portion and open the first valve portion to permit fluid to flow from the source of fluid under pressure to said outlet, and said third diaphragm responding to pressure at the outlet and causing said exhaust valve seat to tend to move away from said second valve portion to cause exhaust of said fluid from said outlet through said exhaust chamber, said second diaphragm being of larger size than said first diaphragm for providing negative feedback from the fluid in the exhaust chamber such that the control pressure is stabilized and so that pressure in said exhaust chamber tends to move said exhaust valve seat toward said second valve portion.

2. The apparatus of claim 1 wherein said first and second valve portions include actuator portions mechanically fixed together for simultaneous movement.

3. The apparatus of claim 2 wherein the first valve portion includes a valve seat fixed with respect to the housing.

* * * * *